United States Patent
Ishii (10) Patent No.: US 8,525,919 B2
(45) Date of Patent: Sep. 3, 2013

(54) IMAGE-PICKUP APPARATUS AND CONTROL METHOD THEREFOR WHICH PROVIDE AT LEAST TWO TYPES OF FOCUS CONTROL AND WHICH OUTPUT INFORMATION FOR CAUSING A USER TO RECOGNIZE THE TYPE OF FOCUS CONTROL CURRENTLY PERFORMED, WHEREIN THE INFORMATION IS OUTPUT WHEN A FIRST OF THE TYPES OF FOCUS CONTROL IS PERFORMED BUT NOT WHEN A SECOND OF THE TYPES OF FOCUS CONTROL IS PERFORMED

(75) Inventor: Kazunori Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 240 days.

(21) Appl. No.: 11/748,631

(22) Filed: May 15, 2007

(65) Prior Publication Data

US 2007/0279516 A1   Dec. 6, 2007

(30) Foreign Application Priority Data

May 29, 2006   (JP) ................................. 2006-148120

(51) Int. Cl.
*H04N 5/232* (2006.01)
*G03B 13/00* (2006.01)

(52) U.S. Cl.
USPC ........................................................ 348/346

(58) Field of Classification Search
USPC .......... 348/345, 348, 349, 350, 353; 396/102
See application file for complete search history.

(56) References Cited

U.S. PATENT DOCUMENTS

| 2002/0149689 A1* | 10/2002 | Sannoh et al. | 348/333.02 |
| 2003/0081137 A1* | 5/2003 | Yamazaki | 348/354 |
| 2004/0202461 A1* | 10/2004 | Nakahara | 396/104 |
| 2005/0052563 A1* | 3/2005 | Yasuda | 348/345 |
| 2005/0168622 A1* | 8/2005 | Kawai et al. | 348/360 |
| 2005/0248683 A1* | 11/2005 | Ariga | 348/370 |
| 2006/0127080 A1* | 6/2006 | Mori et al. | 396/121 |

FOREIGN PATENT DOCUMENTS

| JP | 06-006664 A | 1/1994 |
| JP | 2000-029110 A | 1/2000 |
| JP | 2001-045340 A | 2/2001 |
| JP | 2002-258147 | 9/2002 |
| JP | 2002-311328 | 10/2002 |

* cited by examiner

*Primary Examiner* — Albert Cutler
(74) *Attorney, Agent, or Firm* — Carter, DeLuca, Farrell & Schmidt LLP (57) ABSTRACT

An image-pickup apparatus is disclosed which is capable of performing focus controls by plural AF methods and causing a user to confirm the focus control operation by each of the plural AF methods. The apparatus includes a controller which performs a first focus control and a second focus control by a method different from that of the first focus control, and an information output device which outputs information for causing a user to distinguish whether the first or second focus control is currently performed. The controller performs the second focus control after performing the first focus control, and the information output device outputs the information when the first focus control is performed and does not output the information when the second focus control is performed.

6 Claims, 12 Drawing Sheets

OBJECT DISTANCE $L = \dfrac{B \cdot f}{X}$

IMAGE-PICKUP APPARATUS AND CONTROL METHOD THEREFOR WHICH PROVIDE AT LEAST TWO TYPES OF FOCUS CONTROL AND WHICH OUTPUT INFORMATION FOR CAUSING A USER TO RECOGNIZE THE TYPE OF FOCUS CONTROL CURRENTLY PERFORMED, WHEREIN THE INFORMATION IS OUTPUT WHEN A FIRST OF THE TYPES OF FOCUS CONTROL IS PERFORMED BUT NOT WHEN A SECOND OF THE TYPES OF FOCUS CONTROL IS PERFORMED

BACKGROUND OF THE INVENTION

The present invention relates to an image-pickup apparatus having an AF (auto focus) function such as a digital still camera and a video camera, specifically an image-pickup apparatus having a hybrid AF function capable of using plural AF methods in combination.

Focus control of video cameras is mainly performed by a so-called TV-AF (or a contrast AF method). The TV-AF method is a method in which an AF evaluation value signal is generated by extracting high frequency components from a video signal acquired by photoelectrical conversion of an object image by an image-pickup element and a focus lens is then moved such that the AF evaluation value increases to a maximum. The TV-AF method enables a high accurate focusing because an in-focus determination is done by using a video signal acquired by actually picking up an object image.

In addition, AF methods include an external ranging (distance measuring) method in which an exterior ranging sensor is used. In the external ranging method, a passive ranging method is performed by dividing a luminous flux from an object into two luminous fluxes and receiving them on two light-receiving sensors (line sensors) to calculate a correlation of signals from the line sensors. In the passive ranging method, a shift amount corresponding to the number of pixels of the line sensor at which the correlation reaches a maximum is calculated and ranging information is then acquired on the basis of the shift amount by the principal of triangulation.

On the other hand, active ranging methods include a method in which an ultrasonic sensor is used and ranging is performed by calculation from a propagation velocity of ultrasonic, and a method in which an infrared sensor is used and ranging is performed by triangulation.

These external ranging methods enable to rapidly acquire an in-focus state because an object distance is directly calculated.

Furthermore, AF methods include a TTL phase difference detection method that is often used in single-reflex cameras. The phase difference detection method is a method in which a luminous flux from an image-pickup optical system is divided into two luminous fluxes to cause them to form two images on light-receiving elements (line sensors). In the phase difference detection method, displacement amount (phase difference) and direction of the two images on the line sensors are detected to calculate drive amount and direction of a focus lens for acquiring an in-focus state and then the focus lens is driven.

A hybrid AF has been proposed which uses the above-mentioned external ranging method or phase difference detection method and the above-mentioned TV-AF method in combination (see Japanese Patent Laid-Open No. 2002-258147). In the hybrid AF, a focus lens is rapidly driven to the vicinity of an in-focus position by the external ranging method or the phase difference detection method and then the focus lens is accurately driven from that position to the in-focus position by the TV-AF method.

In addition, in an image-pickup apparatus having such a hybrid AF function, areas for ranging or focus detection (hereinafter the areas are also referred to as detection target areas) may be different in the respective AF methods. Japanese Patent Laid-Open No. 2002-311328 has disclosed an image-pickup apparatus which provides a focus target area and an in-focus determination result in the hybrid AF to a user with a display or sound when a shutter button is half-pressed in a still image pickup mode.

However, the image-pickup apparatus disclosed in Japanese Patent Laid-Open No. 2002-311328 has no function of indicating which one of the external ranging method or phase difference detection method and the TV-AF method is used in the current focus control. In other words, the image-pickup apparatus disclosed in Japanese Patent Laid-Open No. 2002-311328 merely provides focus target areas and in-focus determination results in these AF methods. Therefore, it is difficult to confirm whether or not operations of the hybrid AF in which focus control by the TV-AF method is performed after focus control by the external ranging method or phase difference detection method is performed are normally performed.

Figure 9:
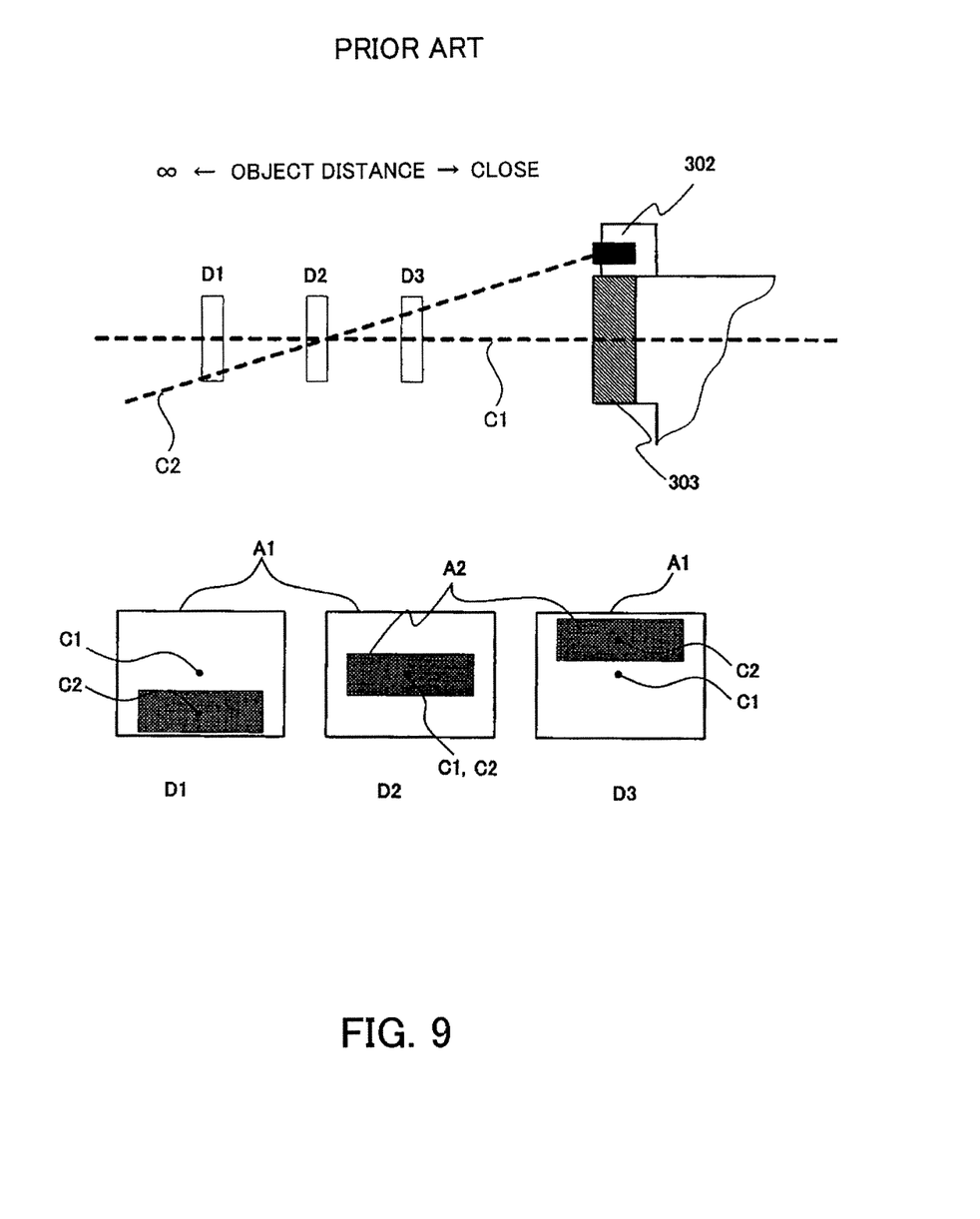
FIG. 9 is a figure for explaining a parallax between detection target areas of the external ranging method and the TV-AF method.

Furthermore, as described above, in the hybrid AF the detection target areas may be different in the respective AF methods combined with each other. In particular, a hybrid AF which uses the TV-AF method and the external ranging method in combination causes, as shown in FIG. 9, a parallax between a focus detection area A1 for the TV-AF method and a ranging area A2 for the external ranging method. This is because an external ranging sensor 302 is provided at a position displaced upward with respect to an optical axis (image-pickup optical axis) of a lens unit 301.

In the case where the external ranging sensor 302 is provided at a position displaced with respect to the image-pickup optical axis, the center C1 of the focus detection area A1 coincides with the center C2 of the ranging area A2 at a certain object distance D2. In this case, focus controls by the TV-AF method and the external ranging method are performed for the same object.

However, the center C2 of the ranging area A2 is displaced vertically from the center C1 of the focus detection area A1 at farther and nearer object distances D1 and D3 than the object distance D2. Accordingly, an in-focus target object in the external ranging method differs from an original in-focus target object (that is, an object intended by a user) in the TV-AF method.

In such a case where the focus control by the external ranging method is performed for an object that is different from the original in-focus target object, the image-pickup apparatus having no function of indicating that the focus control by the external ranging method is currently performed may cause the user to feel that something is wrong in the video camera.

BRIEF SUMMARY OF THE INVENTION

The present invention provides an image-pickup apparatus capable of performing focus controls by plural AF methods, causing a user to confirm the focus control operation by each of the plural AF methods and preventing a user from feeling that something is wrong in the apparatus due to characteristics of the respective AF methods.

As one aspect, the present invention provides an image-pickup apparatus that includes a controller which performs a first focus control and a second focus control by a method different from that of the first focus control, and an information output device which outputs information for causing a user to distinguish whether the first or second focus control is currently performed. The controller performs the second focus control after performing the first focus control, and the information output device outputs the information when the first focus control is performed and does not output the information when the second focus control is performed.

As another aspect, the present invention provides a control method for an image-pickup apparatus that includes a step of performing a first focus control, a step of performing a second focus control by a method different from that of the first focus control, and an output step of outputting information for causing a user to distinguish whether the first or second focus control is currently performed. The second focus control is performed after the first focus control is performed, and in the output step the information is output when the first focus control is performed and the information is not output when the second focus control is performed.

Further objects and features of the present invention will be become more apparent from the following description of preferred embodiments with reference to the drawings.

DETAILED DESCRIPTION OF THE PREFERRED EMBODIMENTS

Hereinafter, preferred embodiments of the present invention will be described with reference to the accompanying drawings.

Embodiment 1

Figure 1:
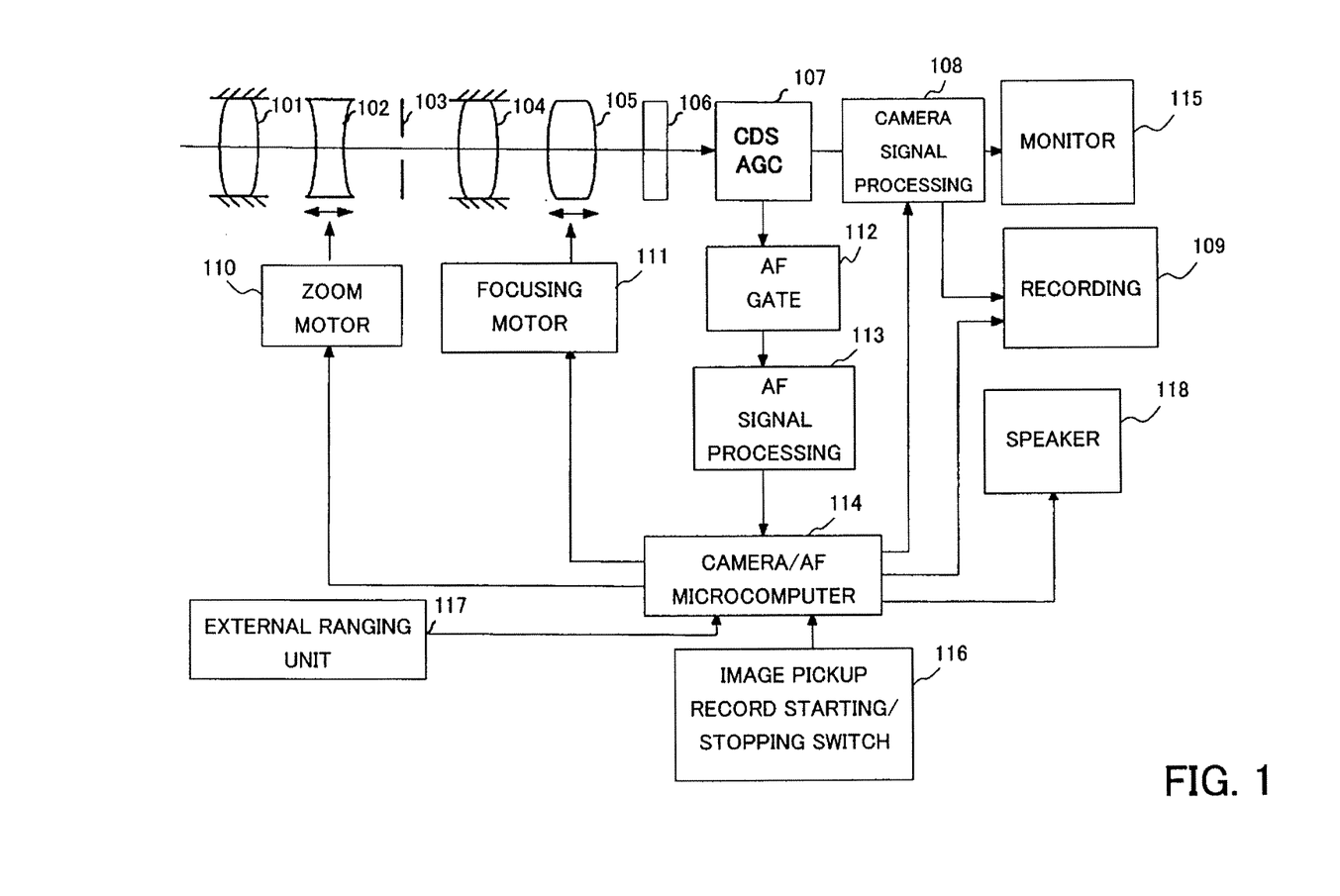
FIG. 1 is a block diagram showing the configuration of a video camera that is Embodiment 1 of the present invention.

FIG. 1 shows the system configuration of a video camera (image-pickup apparatus) which is Embodiment 1 of the present invention.

Although this embodiment will describe a video camera integrated with an image-pickup lens, an embodiment of the present invention includes a video camera to which an image-pickup lens is detachably attached. In this case a control signal generated by a camera/AF microcomputer, which will be described later, is transmitted to a lens microcomputer provided in the image-pickup lens. The camera/AF microcomputer controls drive of a focus lens unit through the lens microcomputer. In addition, although this embodiment will describe a video camera, embodiments of the present invention include various types of image-pickup apparatuses such as a digital still camera. This is also the same in Embodiment 2 which will be described later.

In FIG. 1, reference numeral 101 shows a first fixed lens unit, 102 a lens unit (hereinafter referred to as a zoom lens) that performs variation of magnification, and 103 an aperture stop. Reference numeral 104 shows a second fixed lens unit, and 105 a lens unit (hereinafter referred to as a focus lens) that has a focusing function and a so-called compensating function which compensates for movements of an image plane associated with the variation of magnification. Although each lens unit in the figure seems to be constituted by a single lens, the actual each lens unit may be constituted by a single lens or plural lenses.

The zoom lens 102 and the focus lens 105 are driven in an optical axis direction (horizontal direction in the figure) by a zoom motor 110 and a focusing motor 111, respectively.

A luminous flux from an object passes through an image-pickup optical system constituted by the lens units 101, 102, 104 and 105 and the aperture stop 103 and forms an image on the image-pickup element 106. The image-pickup element 106 is a photoelectrical conversion element such as a CCD sensor or a CMOS sensor and converts the object image formed on its image-pickup plane into an electrical signal. The electrical signal output from the image-pickup element 106 is subjected to sampling and gain adjustment by a CDS/AGC circuit 107 to be input to a camera signal processing circuit 108.

The camera signal processing circuit 108 performs predetermined processes on the signal input from the CDS/AGC circuit 107 to generate a video signal suitable for recording in a recording unit 109 and displaying on a monitor unit 115.

The recording unit 109 records the video signal to a recording medium such as a magnetic tape, an optical disc or semiconductor memory in response to a depressing operation of an image pickup record starting/stopping switch 116. When the image pickup record starting/stopping switch 116 is again depressed, the recording is stopped. The monitor unit 115 displays a video image of the object on a display such as an electronic viewfinder or a liquid crystal panel on the basis of the input video signal.

The video signal output from the CDS/AGC circuit 107 is also output to an AF gate 112. The AF gate 112 selects a signal component in an image area used for a focus control by the TV-AF method, which is a first focus control, among the video signal corresponding to the entire image-pickup region to output it to an AF signal processing circuit 113, which is a second detector.

The image area used for the focus control by the TV-AF method may be arbitrarily set and plural image areas may be set.

The AF signal processing circuit 113 extracts an AF evaluation value signal (focus evaluation value signal) that is used for the focus control by the TV-AF method from the input video signal. The AF evaluation value signal is a signal such as a high frequency component of the video signal or a brightness difference component (that is, a signal corresponding to the difference between a maximum brightness level and a minimum brightness level of the video signal) generated from the high frequency component. The AF signal processing circuit 113 outputs the AF evaluation value signal to the camera/AF microcomputer 114.

Figure 10:
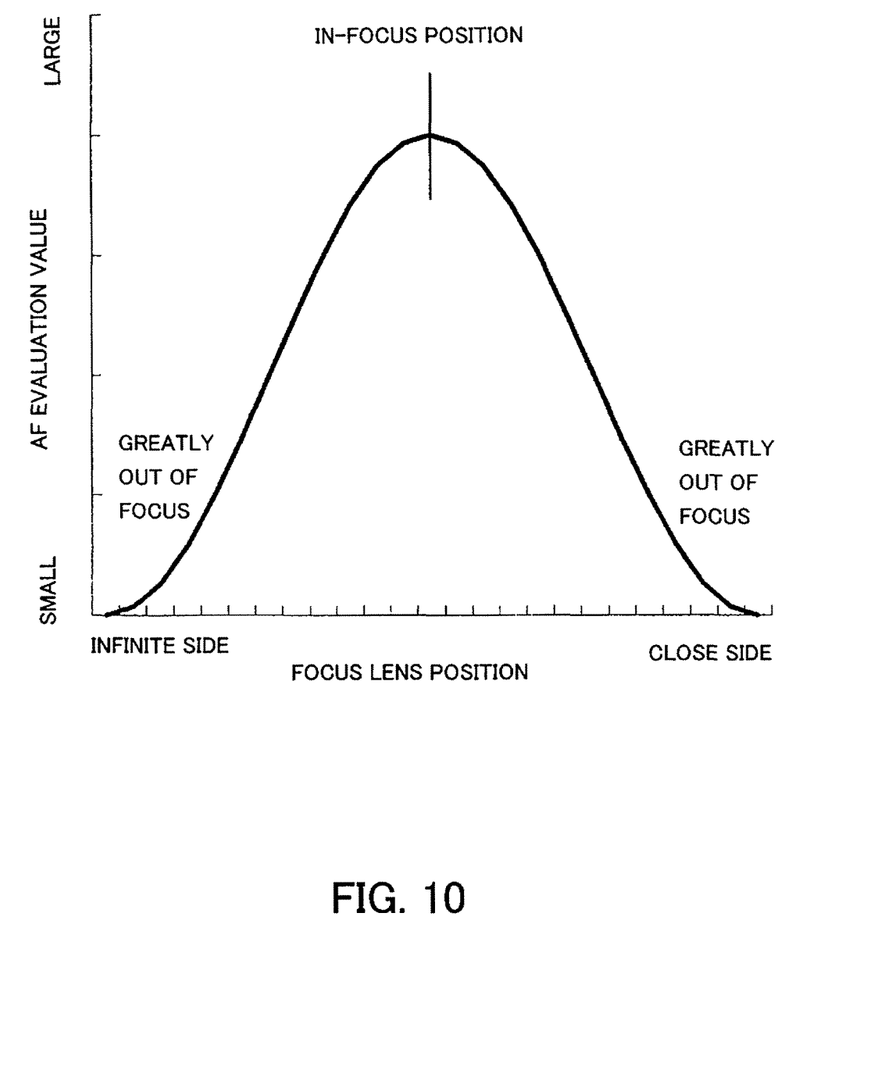
FIG. 10 is a figure showing the principal of AF by the TV-AF method.

The AF evaluation value signal shows sharpness (contrast) of the video signal based on the output signal from the image-pickup element 106 and the sharpness changes depending on the focus state of the image-pickup optical system, so that the AF evaluation value signal shows the focus state of the image-pickup optical system. A position of the focus lens 105 at which the AF evaluation value becomes a maximum level (a maximum value or a value near the maximum value) is generally an in-focus position as shown in FIG. 10.

The camera/AF microcomputer 114 as a controller outputs a control signal to the focusing motor 111 to move the focus lens 105 in minute steps so as to search an in-focus position that is a focus lens position where the AF evaluation value becomes a maximum level. Such a focus control by the TV-AF method is hereinafter referred to as a 'TV-AF operation'.

The camera/AF microcomputer 114 governs control of the entire video camera. The outputs from the above-described AF signal processing circuit 113 and an external ranging unit (or a first detector) 117 which will be later described are input to the camera/AF microcomputer 114 to be used for calculations for AF control. The camera/AF microcomputer 114 outputs the control signal to the focusing motor 111 depending on the calculation results to drive the focus lens 105.

The external ranging unit 117 includes a sensor used for an external ranging (distance measuring) method which generates a signal corresponding to a distance to an object without using a luminous flux that has passed through the image-pickup optical system (image-pickup lens). The external ranging unit 117 divides a luminous flux from an object into two and then causes a pair of line sensors to receive two images formed by the two divided luminous fluxes. The external ranging unit 117 detects a shift amount (phase difference amount) of signals output from the line sensors depending on their received light amounts, that is, a relative displacement amount of the two images in a direction of the division of the luminous flux to calculate a distance to an object (or an object distance) by triangulation.

Figure 11:
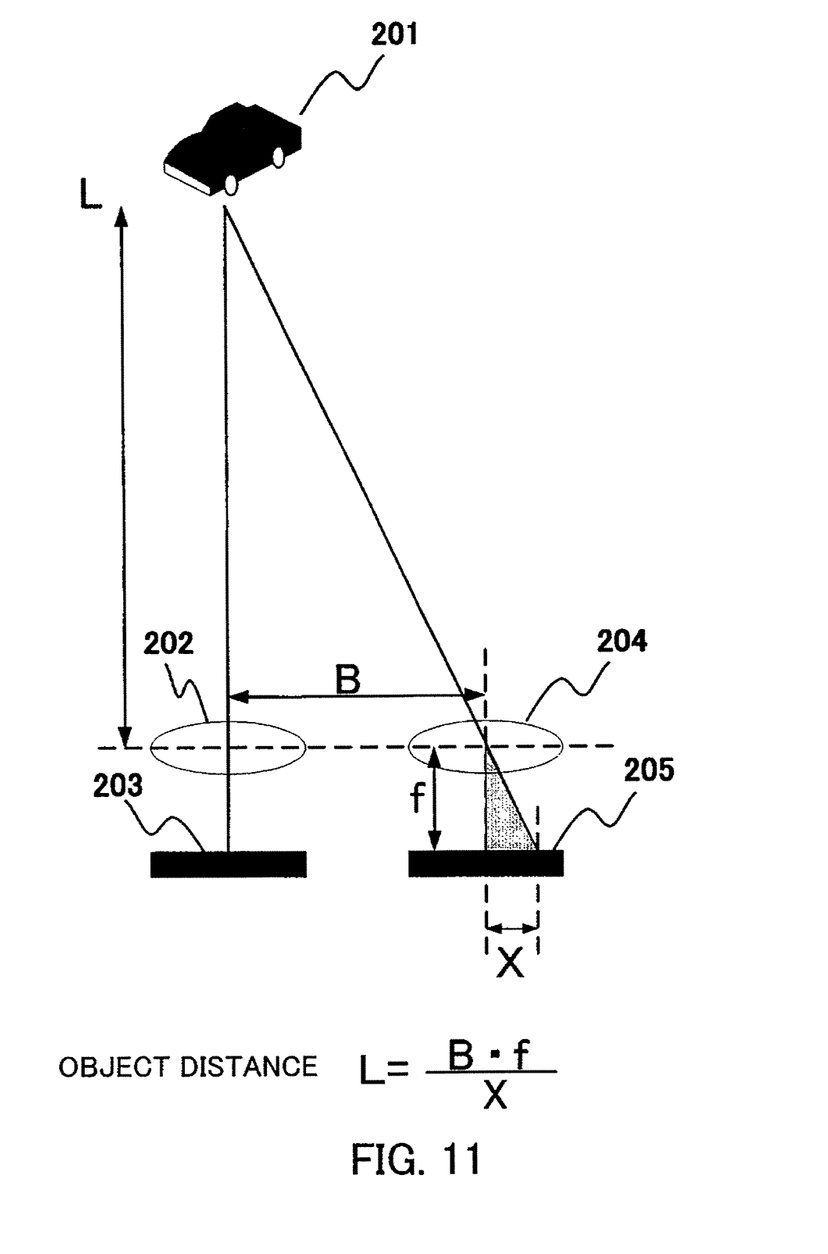
FIG. 11 is a figure showing the principal of triangulation.
Figure 12:
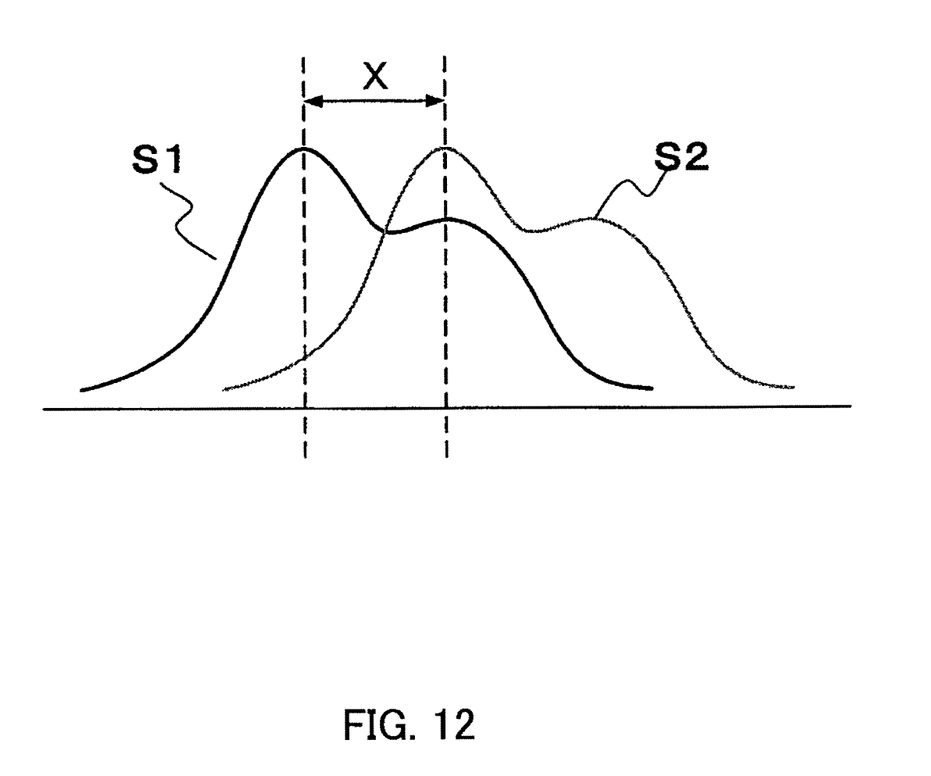
FIG. 12 is a figure showing the principal of correlation calculation.

The principal of distance calculation (ranging) by triangulation is shown by FIGS. 11 and 12. In FIG. 11, reference numeral 201 shows an object, 202 an image-forming lens for a first optical path, 203 a line sensor for the first optical path, 204 an image-forming lens for a second optical path, and 205 a line sensor for the second optical path. The line sensors 203 and 205 are placed away from each other by a base length B.

Of the luminous flux from the object 201, a luminous flux passing through the first optical path including the image-forming lens 202 forms an image on the line sensor 203, and another luminous flux passing through the second optical path including the image-forming lens 204 forms an image on the line sensor 205.

FIG. 12 shows signals (object image signals) read out from the line sensors 203 and 205 receiving the two object images formed by the luminous fluxes that have passed through the first and second optical paths. Since the two line sensors 203 and 205 are placed from each other by the base length B, the object image signals S1 and S2 are shifted from each other by a pixel number of X. Correlation calculation of the two object image signals with shifting of pixels to detect a pixel shift amount at which the correlation becomes a maximum enables to acquire the amount X.

A distance L to the object 201 is given from the amount (phase difference) X, the base length B, a focal length f of the image-forming lenses 202 and 204, and the following equation:

$$L = B \times f / X,$$

by the principal of triangulation.

While this embodiment discusses such a passive ranging method, an alternative embodiment may use, as an active ranging method, a method in which an object distance is acquired from a propagation velocity of ultrasonic measured with an ultrasonic sensor or a triangulation ranging method which is often used in compact cameras and uses infrared light that is projected onto the object. However, the ranging methods used in the embodiments are not limited thereto.

The camera/AF microcomputer 114 calculates a position (in-focus position) of the focus lens 105 at which an in-focus state is acquired on the basis of object distance information (that is, a signal corresponding to an object distance) measured by the external ranging unit 117 and focal length information of the image-pickup optical system. The in-focus position may be read out from table data.

The camera/AF microcomputer 114 outputs the control signal to the focusing motor 111 to move the focus lens 105 to the in-focus position. Such a focus control by the external ranging method is hereinafter referred to as an 'external ranging AF operation'.

The position of the zoom lens 102 can be acquired from an output of a position detection sensor, not shown, or a drive pulse count value of the zoom motor 110 counted from a reference position of the zoom lens 102.

In the video camera of this embodiment, a moving image pickup mode and a still image pickup mode can be set.

Next, detailed description of a hybrid AF control performed by the camera/AF microcomputer 114 will be made with reference to FIGS. 2 and 3. A hybrid AF control performed in the moving image pickup mode will be herein made.

Figure 2:
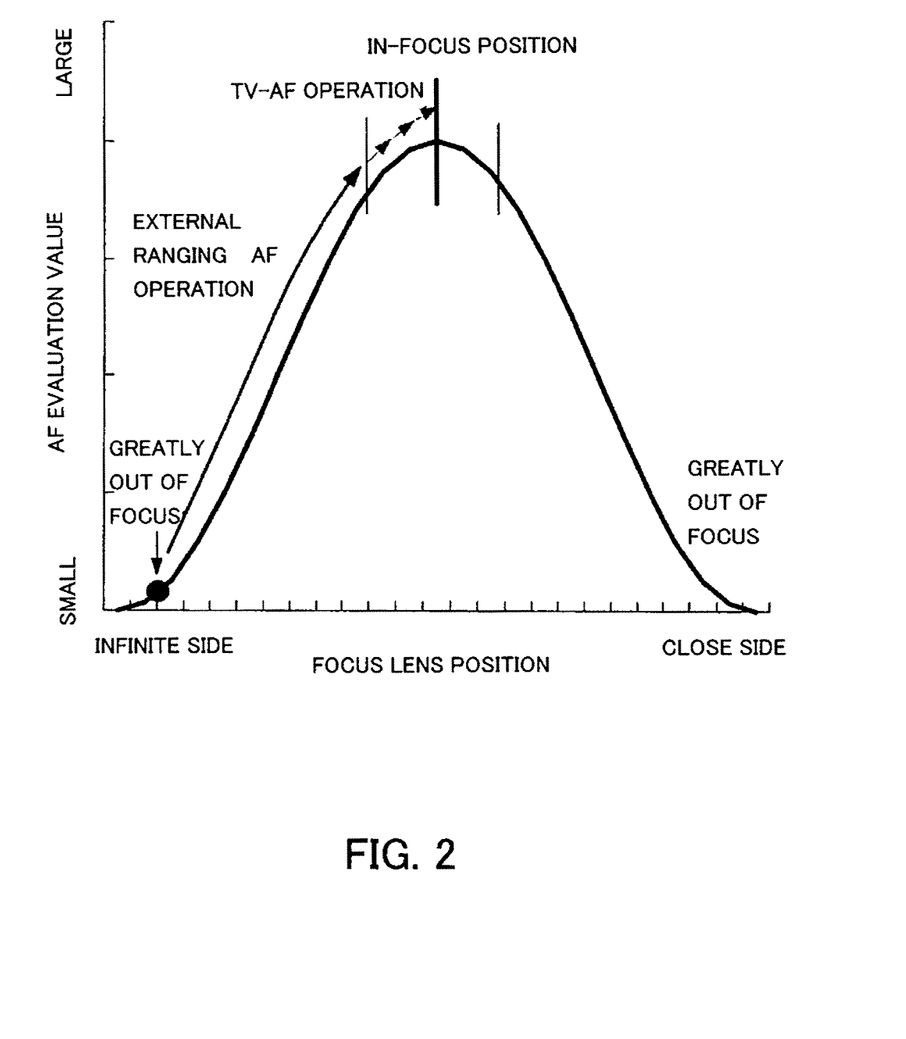
FIG. 2 is a figure for explaining a hybrid AF function of the video camera in Embodiment 1.

FIG. 2 shows an outline of the hybrid AF control. When the current position of the focus lens 105 is near an in-focus position (near the top of a mountain of the AF evaluation value signal), that is, the focus state is near an in-focus state, the TV-AF method is used to increase in-focus accuracy. In contrast, when the current position of the focus lens 105 is far from the in-focus position (near the foot of the mountain of the AF evaluation value signal), that is, the main object in the image-pickup region is greatly out of focus, the external ranging method is used first.

The reasons are as follows. The TV-AF method takes long time to acquire an in-focus state because the method moves the focus lens to the vicinity of an in-focus position with searching for a maximum value of the AF evaluation value. On the other hand, since the external ranging method detects an object distance to immediately an in-focus position of the focus lens, the method can move the focus lens quickly to the in-focus position. Therefore, performing the TV-AF operation after performing the external ranging AF operation enables to acquire an in-focus state rapidly with high accuracy.

Figure 3:
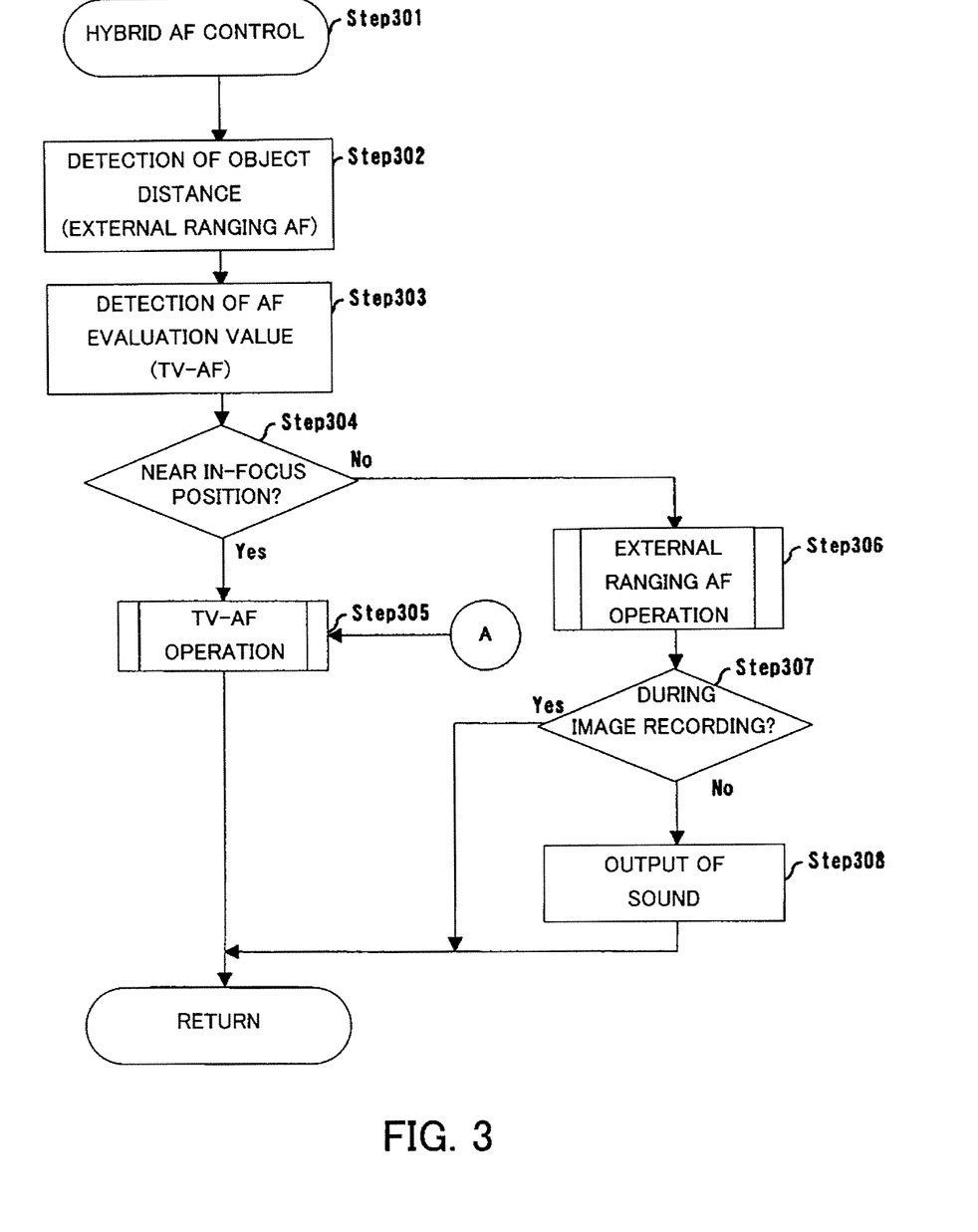
FIG. 3 is a flowchart showing a hybrid AF control in Embodiment 1.

FIG. 3 shows a flowchart of the hybrid AF control in this embodiment. The hybrid AF control is performed according to a computer program stored in a memory, not shown, in the camera/AF microcomputer 114.

After starting of the hybrid AF control at step 301, the camera/AF microcomputer 114 acquires object distance information measured by the external ranging unit 117 (step 302).

Next, the camera/AF microcomputer 114 acquires the AF evaluation value from the AF signal processing circuit 113 (step 303). Then, at step 304, the camera/AF microcomputer 114 determines whether or not the current focus lens position is near an in-focus position.

The determination of whether or not the current focus lens position is near an in-focus position can be made using the AF evaluation value signal or the object distance information. For example, a simple determination of whether or not the current focus lens position is near an in-focus position can be made using a value acquired by normalizing a peak value of the AF evaluation value signal (high frequency component) with a brightness difference component, that is, a component corresponding to the difference between a maximum brightness level and a minimum brightness level of the video signal.

In place of the above determination method, a determination that the current focus lens position is near an in-focus position can be made by comparing the current focus lens position with a focus lens position corresponding to the measured object distance and determining that the difference thereof is small. These determination methods can be used in combination.

Then, when the determination that the current focus lens position is near the in-focus position is made, the camera/AF microcomputer 114 performs the TV-AF operation (step 305). However, the determination that the current focus lens position is not near the in-focus position is made, the camera/AF microcomputer 114 performs the external ranging AF operation (step 306).

When the focus lens 105 has been moved to a position near the in-focus position by the external ranging AF operation, the camera/AF microcomputer 114 determines whether the video camera is in a recording state or a non-recording state (step 307).

The recording state is a state in which the video camera is recording the video signal output from the camera signal processing circuit 108 to a recording medium in the recording unit 109 in response to an operation of the image pickup record starting/stopping switch 116.

The non-recording state is a state in which the video camera is not recording the video signal output from the camera signal processing circuit 108 to the recording medium but displaying it on the monitor unit 115 as an electronic viewfinder image (a live view image).

When the video camera is in the non-recording state, the camera/AF microcomputer 114 as an information output device outputs information indicating that the external ranging AF operation is currently being performed at step 308. The information is output as an electronic sound through a speaker 118. The electronic sound can cause a user (or a photographer) to distinguish that the external ranging AF operation is currently being performed.

The camera/AF microcomputer 114 outputs the electronic sound only in the non-recording state in this embodiment. The reason thereof is that the electronic sound output in the recording state is detected by a sound input part, not shown, such as a microphone and recorded together with the picked-up image to the recording medium.

The information may be output as display information, such as an icon or a character, which is superimposed onto the electronic viewfinder image, in place of the electronic sound. In this case, the information may be output not only in the non-recording state but also in the recording state.

In this embodiment, the information indicating that the external ranging AF operation is being performed is output, but information indicating that the TV-AF operation is being performed is not output. The reasons thereof are as follows.

Firstly, the hybrid AF performs the TV-AF operation after a generally in-focus state is acquired by the external ranging AF operation. Therefore, if a user observes that an in-focus state onto a moving object continues, the user can easily confirm that the TV-AF is normally performed. In contrast, it is difficult to distinguish whether a focusing operation from a greatly out-of-focus state to a generally in-focus state is performed by the TV-AF operation or the external ranging AF operation, from the electronic viewfinder. Therefore, it is preferable to output the above information in order to cause the user to distinguish that the focusing operation is performed by the external ranging AF operation.

Secondly, the TV-AF operation is continuously performed to keep an in-focus state onto a moving object in the moving image pickup mode. In this case, if output of the information indicating that the TV-AF operation is being performed is maintained, this may not only disturb the user but also increase unnecessary power consumption.

For these reasons, the above information is output only during the external ranging AF operation.

Figure 4:
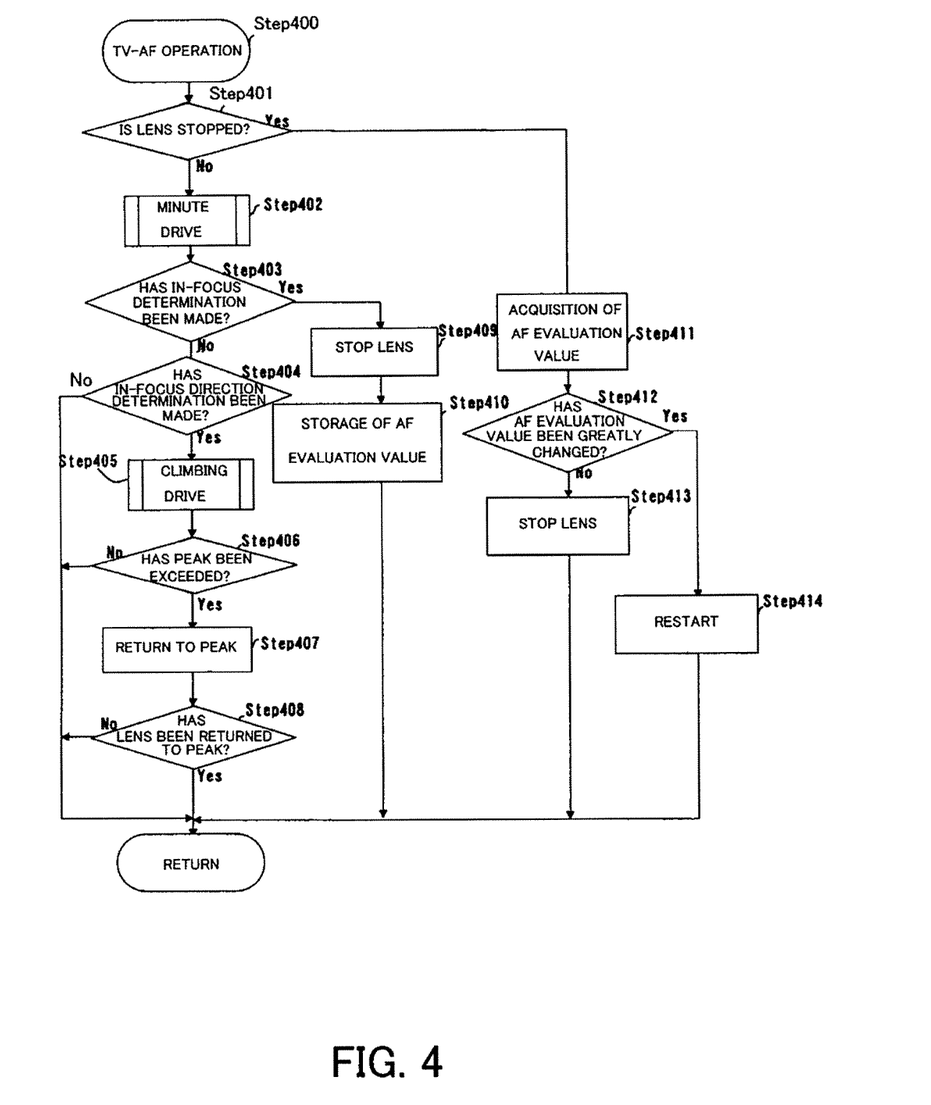
FIG. 4 is a flowchart showing a TV-AF operation in Embodiment 1.

FIG. 4 shows a flowchart for the TV-AF operation. When the camera/AF microcomputer 114 starts the TV-AF operation at step 400, it performs, after processing at step 401 (the processing will be described later), a 'minute drive' at step 402.

Then, the camera/AF microcomputer 114 detects changes of the AF evaluation value in the minute drive to determine whether or not an in-focus determination has been made (step 403) and whether or not an in-focus direction determination has been made (step 404). Specifically, the camera/AF microcomputer 114 repeats a minute amount drive of the focus lens 105 in the same direction several times and then determines that the direction is an in-focus direction if the AF evaluation value has continuously increased. If the AF evaluation value has decreased after having increased, the camera/AF microcomputer 114 determines that it is in an in-focus state.

When an in-focus determination has not been made at step 403 but an in-focus direction determination has been made at step 404, the camera/AF microcomputer 114 performs a 'climbing drive' (step 405) to drive the focus lens 105 to an in-focus position where the AF evaluation value becomes a peak (steps 406 to 408). Specifically, the camera/AF microcomputer 114 performs such a control that, if the AF evaluation value has exceeded the peak at step 406, the focus lens 105 is returned to the peak position (steps 407 and 408).

Then, if the camera/AF microcomputer 114 determines that the in-focus determination has been made at step 403, it proceeds to step 409 to stop the focus lens 105. Next, the camera/AF microcomputer 114 stores the AF evaluation value (the peak value) at the time of stoppage of the focus lens 105 into a memory, not shown, at step 410 in order to determine whether or not to restart (re-execute) the TV-AF operation.

After that, when a determination that the focus lens 105 is under stoppage has made at step 401, the camera/AF microcomputer 114 takes in the current (newest) AF evaluation value at step 411.

Furthermore, at step 412, the camera/AF microcomputer 114 compares the newest AF evaluation value taken in at step 411 with the AF evaluation value stored at step 410. If the difference therebetween is larger than a predetermined value (that is, it is in an out-of-focus state), the camera/AF microcomputer 114 restarts the TV-AF operation (step 414). If the difference is smaller than the predetermined value, the camera/AF microcomputer 114 keeps the focus lens 105 stopped (step 413).

Figure 5:
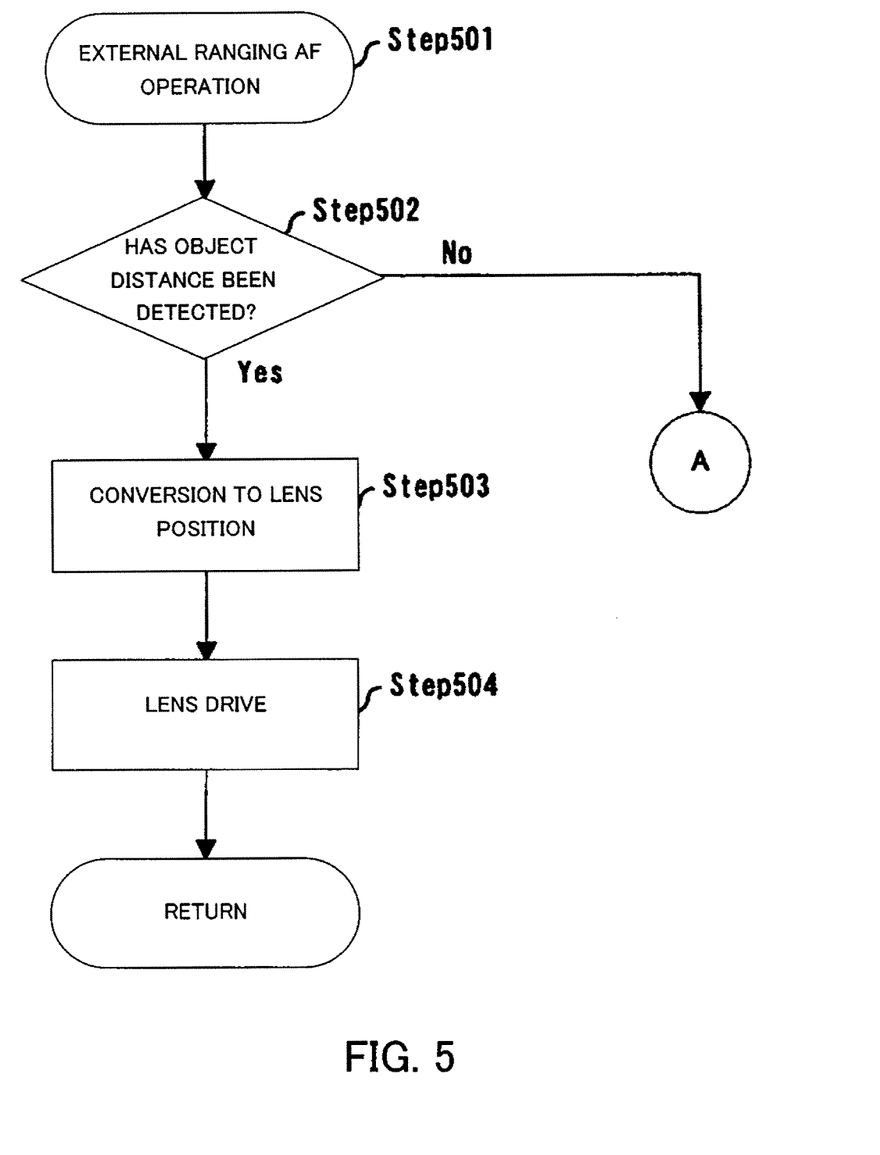
FIG. 5 is a flowchart showing an external ranging AF operation in Embodiment 1.

FIG. 5 shows a flowchart for the external ranging AF operation. When the camera/AF microcomputer 114 starts the external ranging AF operation at step 501, it determines at step 502 whether or not an object distance detection by the external ranging unit 117 has been made at step 302. If the object distance detection has not been made, the camera/AF microcomputer 114 ends the external ranging AF operation to proceed to the TV-AF operation. If the object distance detection has been made, the camera/AF microcomputer 114 proceeds to step 503.

At steps 503 and 504, the camera/AF microcomputer 114 calculates or reads out from table data an in-focus position of the focus lens 105 based on the object distance information and focal length information of the image-pickup optical system to drive the focus lens 105 to the in-focus position.

The 'in-focus position' in the external ranging AF operation means a position near the in-focus position acquired by the TV-AF operation.

Embodiment 2

Figure 6:
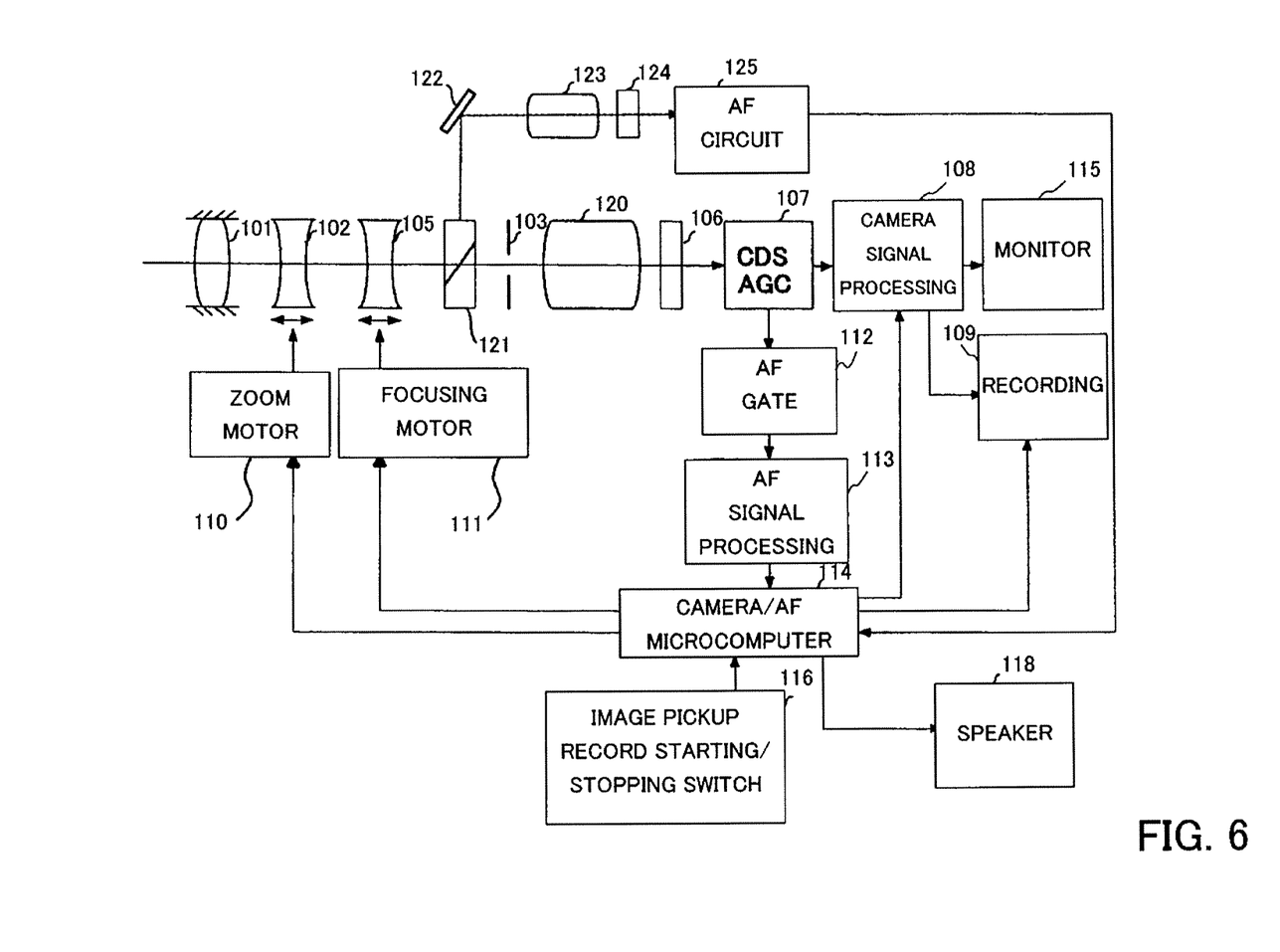
FIG. 6 is a block diagram showing the configuration of a video camera that is Embodiment 2 of the present invention.

FIG. 6 shows the system configuration of a video camera (image-pickup apparatus) which is Embodiment 2 of the present invention. In this embodiment, components identical to those in Embodiment 1 are designated with the same reference numerals as those in Embodiment 1 and description thereof is omitted.

Although Embodiment 1 described a case where the external ranging AF operation was employed as the first focus control, this embodiment employs a focus control by a TTL (internal measuring) phase difference detection method (hereinafter referred to as a phase difference AF operation).

An image-pickup optical system includes, in order from an object side (left side in the figure), a first fixed lens unit 101, a zoom lens 102, a focus lens 105, an aperture stop 103, and an image-forming lens unit 120. Although each lens unit in the figure seems to be constituted by a single lens, the actual each lens unit may be constituted by a single lens or plural lenses.

The image-pickup optical system in this embodiment includes a half prism 121 between the focus lens 105 and the aperture stop 103. The half prism 121 introduces one of divided luminous fluxes to a phase difference detection unit (first detector) 124, which will be described later, through a sub mirror 122 and transmits the other to introduce to an image-pickup element 106. In this embodiment, since the aperture stop 103 is operated during picking up moving images, the half prism 121 is disposed closer to an object than the aperture stop 103.

The phase difference detection unit 124 includes a pair of line sensors (AF sensors) for detecting a phase difference. Reference numeral 123 denotes an AF image-forming lens that divides a luminous flux from the sub mirror 122 into two to cause the two luminous fluxes to form two images on the pair of line sensors. An AF circuit 125 calculates the phase difference showing a displacement of the two images on the basis of outputs from the line sensors.

A camera/AF microcomputer 114 calculates a defocus amount and a defocus direction of the image-pickup optical system on the basis of phase difference information from the AF circuit 125.

Figure 7:
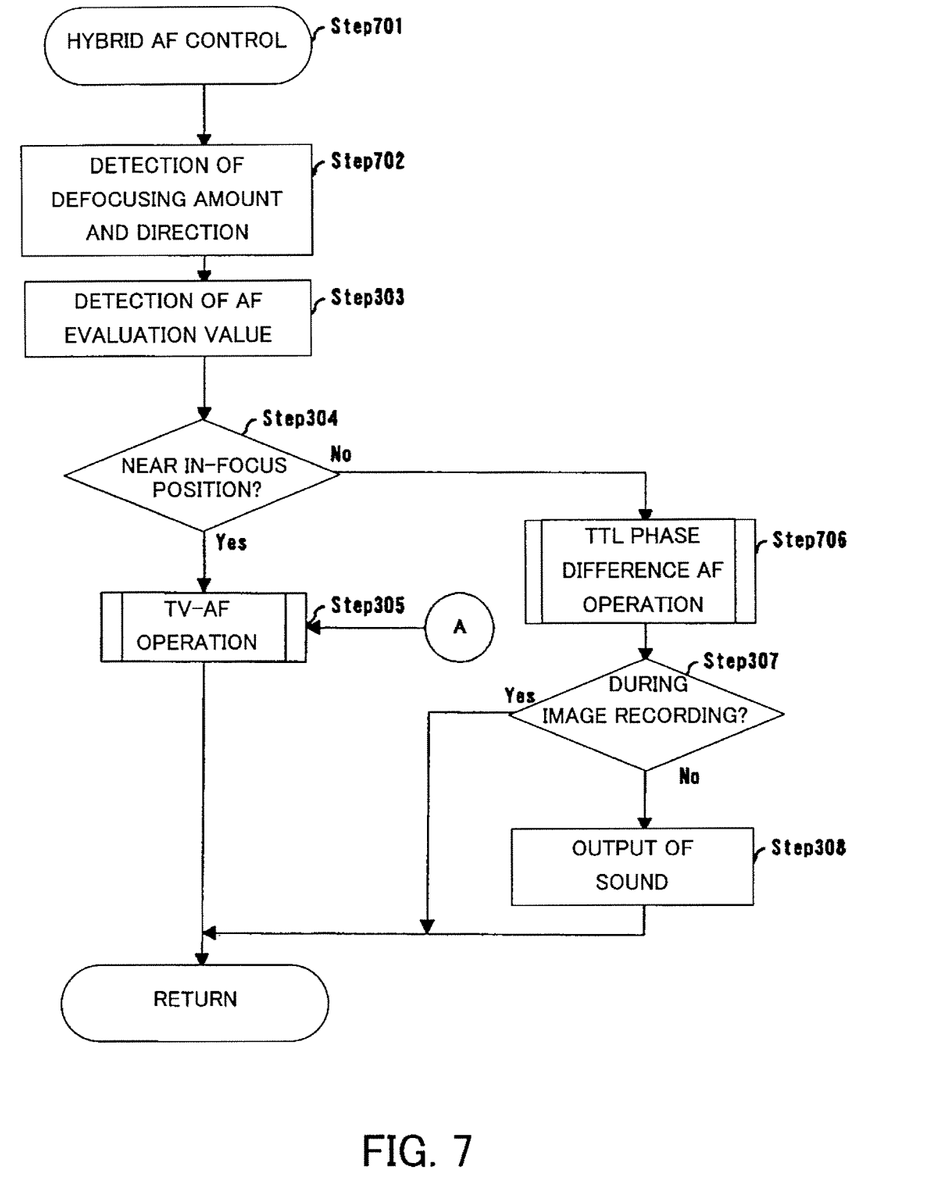
FIG. 7 is a figure for explaining a hybrid AF function of the video camera in Embodiment 2.
Figure 8:
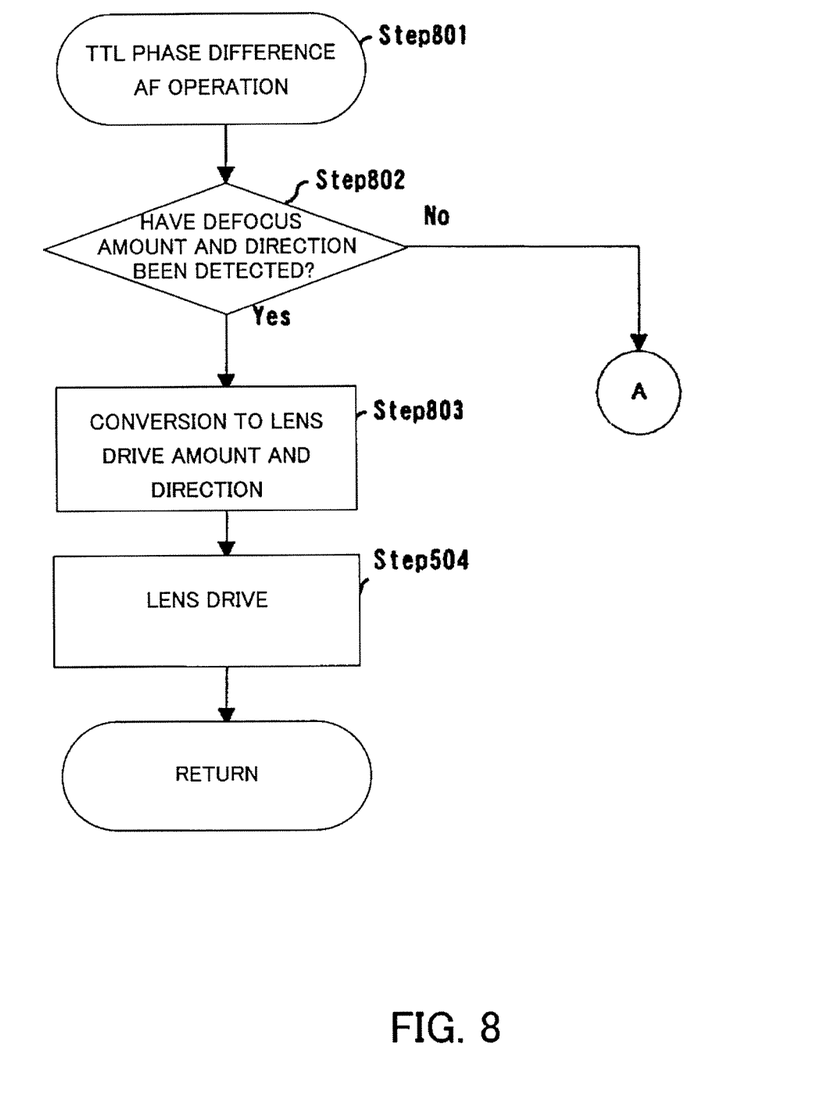
FIG. 8 is a flowchart showing a phase difference AF operation in Embodiment 2.

This embodiment also can perform a hybrid AF control with an algorithm similar to that described in Embodiment 1. FIGS. 7 and 8 show a flowchart for the hybrid AF control and the phase difference AF operation in a moving image pickup mode in this embodiment. In these figures, steps identical to those in Embodiment 1 are designated with the same step numbers as those in Embodiment 1 and description thereof is omitted.

In this embodiment, the camera/AF microcomputer 114 that has started the hybrid AF control at step 701 in FIG. 7 calculates (or detects) a defocus amount and a defocus direction on the basis of phase difference information from the AF circuit 125 at step 702.

When a determination that the focus lens position is near an in-focus position has not been made at step 304, the camera/AF microcomputer 114 drives the focus lens 105 to the in-focus position calculated based on the defocus amount and defocus direction at step 706. In this period, if it is not during image recording (step 307), the camera/AF microcomputer 114 outputs an electronic sound (or a display) at step 308.

Further, the camera/AF microcomputer 114 that has started the phase difference AF operation at step 801 in FIG. 8 determines whether or not a detection of the defocus amount and defocus direction has been made at step 802. If the detection has not been made, the camera/AF microcomputer 114 calculates an in-focus position (that is, a drive amount and a drive direction) of the focus lens 105 at step 803 and then drives the focus lens 105 thereto at step 504.

As described above, according to each of the embodiments, in-focus operations by the hybrid AF can be performed rapidly with high accuracy.

In addition, the information (an electronic sound or a display) output at the time of driving the focus lens to a position near an in-focus position by the external ranging or phase difference AF operation can cause a user to recognize that the external ranging or phase difference AF operation is being performed. This can cause the user to confirm whether or not the external ranging or phase difference AF operation is normally performed before the TV-AF operation, which is a feature of the hybrid AF, and when and where the external ranging or phase difference AF operation is performed.

Furthermore, the information can cause the user to realize that the focus control speed of the video camera is increased by the external ranging or phase difference AF operation. Moreover, the stoppage of the output of the information can give the user a simple recognition that an in-focus state has been acquired by the external ranging or phase difference AF operation.

In addition, even when an in-focus target object (that is, a ranging area) in the external ranging AF operation differs from an original in-focus target object in the TV-AF operation (that is, a focus detection area), the information can cause the user to recognize that the difference between the in-focus target objects is temporarily occurring. This can reduce the user's feeling that something is wrong in the video camera.

In other words, according to each of the embodiments, the information can cause the user to clearly distinguish the focus control that is currently being performed. This can cause the user to certainly confirm the operation of each focus control, and prevents the user from feeling that something is wrong in the image-pickup apparatus even when an in-focus target object in the first focus control differs from an in-focus target object in the second focus control.

Although each of the above embodiments described the hybrid AF in the moving image pickup mode, a hybrid AF similar to that hybrid AF may be performed in a still image pickup mode. Further, also in the still image pickup mode, the information indicating that the external ranging or phase difference AF operation is being performed may be output.

Furthermore, the present invention is not limited to these preferred embodiments and various variations and modifications may be made without departing from the scope of the present invention.

This application claims foreign priority benefits based on Japanese Patent Application No. 2006-148120, filed on May 29, 2006, which is hereby incorporated by reference herein in its entirety as if fully set forth herein.

What is claimed is:

1. An image-pickup apparatus comprising:

a controller configured to automatically select and perform one of a first focus control and a second focus control, the first focus control being performed by a method in which a phase difference of a pair of images formed by a luminous flux from an image-pickup optical system is acquired and then an in-focus position of a focus lens is acquired on the basis of the phase difference, and the second focus control being performed by a method in which a focus evaluation value signal is generated from a video signal generated by using an image-pickup element and then an in-focus position of the focus lens is acquired on the basis of the focus evaluation value signal, wherein the controller drives the focus lens to the in-focus position acquired by the first focus control, and then drives the focus lens to the in-focus position acquired by the second focus control when the focus lens is located at a position near the in-focus position; and an information output device configured to output, to a user, information indicating that the first focus control is being performed, wherein, during a sequence of focus controls in which the focus lens is moved by the first focus control and then moved by the second focus control, the information output device outputs the information after the focus lens is moved to the position near the in-focus position by detecting the in-focus position by the first focus control, and does not output the information while the focus lens is being moved by the second focus control, and wherein the information output device determines whether the image-pickup apparatus is in a recording state or a non-recording state after the focus lens is moved to the position near the in-focus position by the first focus control, and outputs the information when the image-pickup apparatus is in the non-recording state.

2. The image-pickup apparatus according to claim 1, wherein the information output device outputs the information in a moving image pickup mode.

3. The image-pickup apparatus according to claim 1, wherein the information output device outputs a sound as the information.

4. The image-pickup apparatus according to claim 3, wherein the information output device outputs the sound in a state other than during image recording.

5. The image-pickup apparatus according to claim 1, wherein the information output device displays the information on a display.

6. A control method for an image-pickup apparatus, the control method comprising:

performing a first focus control in which a phase difference of a pair of images formed by a luminous flux from an image-pickup optical system is acquired and then an in-focus position of a focus lens is acquired on the basis of the phase difference;

performing a second focus control in which a focus evaluation value signal is generated from a video signal generated by using an image-pickup element and then an in-focus position of the focus lens is acquired on the basis of the focus evaluation value signal;

outputting, to a user, information indicating that the first focus control is being performed; and driving the focus lens to the in-focus position acquired by the first focus control and then driving the focus lens to the in-focus position acquired by the second focus control when the focus lens is located at a position near the in-focus position, wherein, during a sequence of focus controls in which the focus lens is moved by the first focus control and then moved by the second focus control, outputting the information is performed after the focus lens is moved to the position near the in-focus position by detecting the in-focus position by the first focus control, and outputting the information is not performed while the focus lens is being moved by the second focus control, and wherein outputting the information includes determining whether the image-pickup apparatus is in a recording state or a non-recording state after the focus lens is moved to the position near the in-focus position by the first focus control, and outputting the information when the image-pickup apparatus is in the non-recording state.

* * * * *